(12) United States Patent
Fukagawa

(10) Patent No.: US 6,938,150 B2
(45) Date of Patent: Aug. 30, 2005

(54) PROCESSOR FOR MANAGING LATEST SPECULATION STATES AND EFFICIENTLY REUSING REORDER BUFFER ENTRIES

(75) Inventor: Masao Fukagawa, Tokyo (JP)

(73) Assignee: NEC Corporation, Tokyo (JP)

( * ) Notice: Subject to any disclaimer, the term of this patent is extended or adjusted under 35 U.S.C. 154(b) by 450 days.

(21) Appl. No.: 10/040,392

(22) Filed: Jan. 9, 2002

(65) Prior Publication Data

US 2002/0091913 A1 Jul. 11, 2002

(30) Foreign Application Priority Data

Jan. 10, 2001 (JP) .................................... 2001-002141

(51) Int. Cl.[7] .............................................. G06F 9/00
(52) U.S. Cl. ..................................................... 712/218
(58) Field of Search ................................ 712/218, 233, 712/234, 239

(56) References Cited

U.S. PATENT DOCUMENTS

| | | | |
|---|---|---|---|
| 5,611,063 A | * | 3/1997 | Loper et al. ................. 712/205 |
| 5,870,579 A | * | 2/1999 | Tan ............................ 712/217 |
| 5,933,618 A | | 8/1999 | Tran et al. |
| 5,983,342 A | | 11/1999 | Tran |
| 6,289,442 B1 | * | 9/2001 | Asato ......................... 712/239 |

FOREIGN PATENT DOCUMENTS

| | | |
|---|---|---|
| JP | 4-242431 | 8/1992 |
| JP | 5-173785 | 7/1993 |
| JP | 7-306785 | 11/1995 |
| JP | 9-244892 | 9/1997 |
| JP | 10-269079 A | 10/1998 |
| JP | 11-194940 A | 7/1999 |
| WO | WO 00/42500 A1 | 8/1999 |

* cited by examiner

Primary Examiner—Eddie Chan
Assistant Examiner—David J. Huisman
(74) Attorney, Agent, or Firm—Sughrue Mion, PLLC

(57) ABSTRACT

By using an entry number (WRB number) of a re-order buffer 6, each of function units such as an operation unit 3, a store unit 4, a load unit 5, etc. notifies to the re-order buffer 6 the processing end for a instruction stored in the entry concerned in the unit thereof. The load unit 5 manages the latest speculation state of a load instruction issued on the basis of a branch prediction success/failure signal output from the branch unit 2, and makes no notification to the re-order buffer 6 on the basis of WRB number for subsequent load instructions of a branch-prediction failed branch instruction even when the processing of the instruction is finished. Accordingly, the re-order buffer 6 can re-use entries in which the subsequent instructions of the branch prediction failed branch instruction are stored.

4 Claims, 6 Drawing Sheets

| INSTRUCTION | BRANCH LEVEL |
|---|---|
| LOAD INSTRUCTION 1 | 0 |
| LOAD INSTRUCTION 2 | 0 |
| OPERATION INSTRUCTION 1 | 0 |
| STORE INSTRUCTION 1 | 0 |
| BRANCH INSTRUCTION 1 | 0 |
| OPERATION INSTRUCTION 2 | 1 |
| OPERATION INSTRUCTION 3 | 1 |
| LOAD INSTRUCTION 3 | 1 |
| LOAD INSTRUCTION 4 | 1 |
| OPERATION INSTRUCTION 4 | 1 |
| BRANCH INSTRUCTION 2 | 1 |
| LOAD INSTRUCTION 5 | 2 |
| LOAD INSTRUCTION 6 | 2 |
| OPERATION INSTRUCTION 5 | 2 |
| BRANCH INSTRUCTION 3 | 2 |

FIG.6

| WRB NUMBER | V BIT | OPE CODE | BRANCH LEVEL | DONE |
|---|---|---|---|---|
| 00 | 0 | LOAD INSTRUCTION 1 | 0 | 1 |
| 01 | 0 | LOAD INSTRUCTION 2 | 0 | 1 |
| 02 | 0 | OPERATION INSTRUCTION 1 | 0 | 1 |
| 03 | 0 | STORE INSTRUCTION 1 | 0 | 1 |
| 04 | 1 | BRANCH INSTRUCTION 1 | 0 | 0 |
| 05 | 1 | OPERATION INSTRUCTION 2 | 1 | 0 |
| 06 | 1 | OPERATION INSTRUCTION 3 | 1 | 0 |
| 07 | 1 | LOAD INSTRUCTION 3 | 1 | 0 |
| 08 | 1 | LOAD INSTRUCTION 4 | 1 | 0 |
| 09 | 1 | OPERATION INSTRUCTION 4 | 1 | 0 |
| 0B | 1 | BRANCH INSTRUCTION 2 | 2 | 0 |
| 0C | 1 | LOAD INSTRUCTION 5 | 2 | 0 |
| 0D | 1 | LOAD INSTRUCTION 6 | 2 | 0 |
| 0E | 1 | OPERATION INSTRUCTION 5 | 2 | 0 |
| 10 | 1 | BRANCH INSTRUCTION 3 | 0 | 1 |
| 11 | 0 | --- | 0 | 1 |
| 12 | 0 | --- | 0 | 1 |
| 13 | 0 | --- | 0 | 1 |
| 14 | 0 | --- | 0 | 1 |
| 15 | 0 | --- | 0 | 1 |
| 16 | 0 | --- | 0 | 1 |

…

PROCESSOR FOR MANAGING LATEST SPECULATION STATES AND EFFICIENTLY REUSING REORDER BUFFER ENTRIES

BACKGROUND OF THE INVENTION

1. Field of the Invention

The present invention relates to a processor for performing out-of-order execution by using a re-order buffer or the like and to a re-order buffer managing method that can efficiently use the re-order buffer.

2. Description of the Related Art

A system of executing instructions in parallel while skipping over the order of the instructions in a program is called "out-of-order execution", and it can enhance the practical parallel degree more than "in-order execution". Therefore, this system is indispensable to high-performance processors.

In an out-of-order execution processor, data dependence relationships such as inverse-dependence and output-dependence are detected, and these are solved to perform the out-of-order execution. The inverse-dependence occurs when a destination register of a subsequent instruction is coincident with a source register of a precedent instruction. The output-dependence occurs when the destination register is coincident between the subsequent instruction and the preceding instruction. These can be solved by holding the execution result of the subsequent instruction in a temporary register and writing data in an original register according to a program order. The execution of an instruction using the execution result of the subsequent instruction can be started by reading out data from the temporary register even before the data are stored in the original register. This is called "registry naming", and a temporary register used therefor is called a "remaining register".

In the out-of-order execution processor, a buffer for holding execution start (issue) waiting instructions such as a skipped instruction is called a "reservation station", and a buffer for carrying out the rewriting of the execution result in program order is called a "re-order buffer ". As the size of the buffer is large, the range of an instruction string for which the out-of-order execution can be performed can be increased. Further, with respect to the control dependence, a branch destination is predicted and instruction execution is speculatively performed, whereby the parallel execution is enabled. The cancellation of the speculative execution and processing when an exception occurs are generally implemented as a function of the re-order buffer.

As described above, in order to increase the range of the instruction string for which the out-of-order execution can be performed, a re-order buffer having a large size is needed. A technological restriction is imposed on the upper limit of the size, and thus it is important how efficiently the re-order buffer having the restricted size is used. However, there has been hitherto such a disadvantage that even when an speculative instruction string in a re-order buffer is cancelled because of a failure of a branch prediction, an entry used for a non-completed load instruction which is contained in entries used for the speculative instruction string thus cancelled, cannot be immediately used for a subsequent instruction.

SUMMARY OF THE INVENTION

The present invention has an object to enhance the using efficiency of re-order buffer.

In order to attain the above object, according to the present invention, there is provided a managing method for a re-order buffer in an out-of order execution processor for predicting the flow of a program by a branch prediction, determining a next executable instruction from an instruction string in the program and speculatively executing the instruction on the basis of a dependence relationship between the prediction and the instruction, in which the re-order buffer rewrites an execution result according to a program order and the end of the instruction is notified from each of a plurality of function units containing a branching unit and a load unit to the re-order buffer by using a WRB number corresponding to an entry number of the re-order buffer, which comprises the steps of managing the latest speculation state of a load instruction issued to the load unit by the load unit on the basis of a branch prediction success/failure signal output from the branching unit and suppressing notification to the re-order buffer by the load unit, as to a subsequent load instruction of a branch instruction for which the branching prediction has failed, on the basis of the WRB number of the subsequent load instruction even if the processing of the load instruction concerned is finished, and re-using an entry stored with the subsequent instruction of the branching instruction which the branching-prediction has failed, by the re-order buffer, to store a new instruction before the end notification based on the WRB number of the entry concerned is received, wherein a control signal for discriminating non-speculative execution/speculative execution for every instruction, which corresponds to a branching level, is generated in an instruction fetch/decode unit, the branching level being set to zero when the instruction concerned is an instruction for non-speculative execution, and the branching level being set at a value of 1 or more which is determined by the number of branching instructions interposed between the instruction for the non-speculative execution and the instruction for the speculative execution when the instruction concerned is an instruction for speculative execution, the control signal thus generated is held in said re-order buffer and said load unit, and the branching level is decremented by 1 in said re-order buffer and said load unit when a branch prediction failure signal is output from said branching unit, thereby managing the latest instruction speculation state.

Further, according to the present invention, there is provided an out-of-order execution processor for predicting the flow of a program by branch prediction, determining a next executable instruction from an instruction string in the program and speculatively executing the instruction on the basis of dependence relationship between the prediction and the instruction, in which a re-order buffer in the processor rewrites an execution result according to a program order and the end of the instruction is notified from each of a plurality of function units containing a branching unit and a load unit to the re-order buffer by using a WRB number corresponding to an entry number of the re-order buffer, which comprises: managing means for managing the latest speculation state of a load instruction issued to the load unit on the basis of a branch prediction success/failure signal output from the branching unit and suppressing notification to the re-order buffer, as to a subsequent load instruction of a branch instruction for which the branching prediction has failed, on the basis of the WRB number of the subsequent load instruction even if the processing of the load instruction concerned is finished, the managing means being contained in the load unit, wherein the re-order buffer re-uses an entry stored with the subsequent instruction of the branching instruction which the branching-prediction has failed, to store a new instruction before the end notification based on the WRB number of the entry concerned is received, wherein a control signal for discriminating non-speculative execution/speculative execution for every instruction, which corresponds to a branching level, is generated in an instruction fetch/decode unit, the branching level being set to zero when the instruction concerned is an instruction for non-speculative execution, and the branching level being set at a value of 1 or more which is determined by the number of branching instructions interposed between the instruction for the non-speculative execution and the instruction for the speculative execution when the instruction concerned is an instruction for speculative execution, the control signal thus generated is held in said re-order buffer and said managing means, and the branching level is decremented by 1 in said re-order buffer and said managing means when a branch-prediction failure signal is output from said branching unit, thereby managing the latest instruction speculation state.

According to the present invention, in the load unit, the latest speculation state of the load instruction issued to the self unit is managed on the basis of the branch-prediction success/failure signal output from the branching unit, and with respect to the subsequent load instruction of a branching instruction for which the branching prediction fails, the notification to the re-order buffer on the basis of the WRB number of the load instruction concerned is suppressed even when the processing thereof is finished, so that the WRB number of the load instruction concerned can be prevented from being afterwards notified from the load unit even when a non-completed load instruction existing in the subsequent instruction string is cancelled. Therefore, even when a cancelled entry of the re-order buffer is re-used as a new instruction, the DONE bit of the another new instruction is prevented from being erroneously turned on, and the entry of the re-order buffer in which the subsequent instruction of the branching-prediction failed branching instruction is stored can be quickly re-used for storage of a new instruction without waiting for an end notification based on the WRB number of the entry concerned.

BRIEF DESCRIPTION OF THE DRAWINGS

FIG. 6 is a diagram showing an example of the contents of a re-order buffer at a given time.

DETAILED DESCRIPTION OF THE PREFERRED EMBODIMENTS

Preferred embodiments according to the present invention will be described hereunder with reference to the accompanying drawings.

Figure 1:
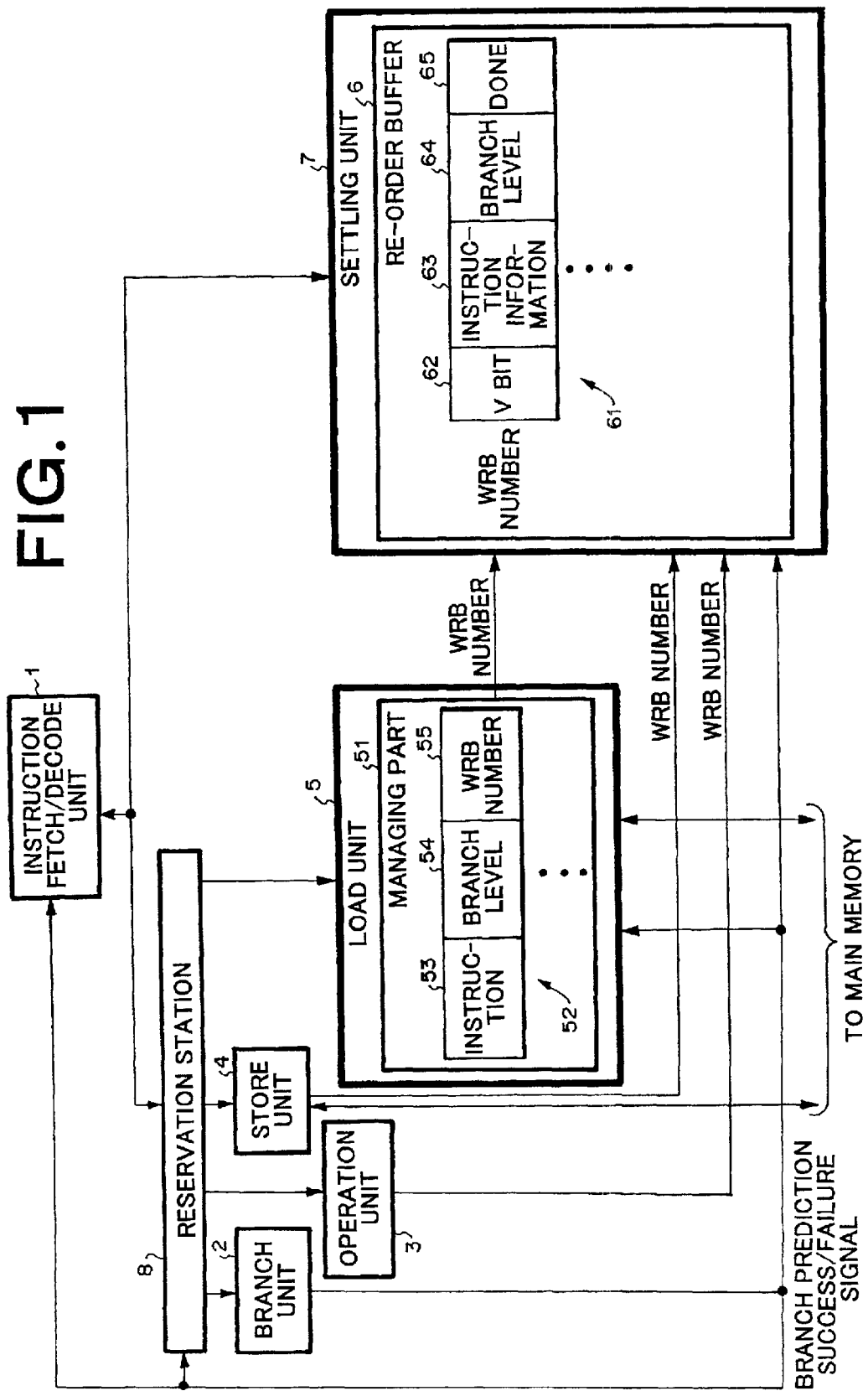
FIG. 1 is a block diagram showing the construction of a processor to which the present invention is applied.

FIG. 1 is a block diagram showing the construction of a processor to which the present invention is applied.

The process shown in FIG. 1 is an out-of-order execution processor for predicting the flow of a program by branching prediction, searching a next executable instruction from an instruction string in the program and speculatively executing an instruction on the basis of a dependence relationship between the prediction and the instruction, which includes, as main parts, instruction fetch/decode unit 1, function units, that is, branching unit 2, operation unit 3, store unit 4 and load unit 5, settling unit 7, and reservation station 8 provided at the front stage of the respective units. The settling unit 7 has re-order buffer 6 which has plural entries 61. The load unit 5 has managing part 51 which has plural entries 52 for holding and managing issued load instructions.

In the embodiment of FIG. 1, the store unit 4 and the load unit 5 are designed as separate units, however, they may be included in the same unit (load/store unit). Further, one reservation station 8 which is commonly used along with the respective function units is provided. However, a reservation station may be provided for each function unit, or a common reservation station may be provided to a group of function units.

The instruction fetch/decode unit 1 fetches an instruction from an instruction cache and decodes the instruction. It also controls the registry naming processing to overcome the instruction dependence relationship and the speculative execution in the branching direction predicted by branching prediction. In order to investigate the instruction dependence relationship, the instruction fetch/decode unit 1 refers to a preceding instruction which has already been stored in the re-order buffer 6. Further, the instruction fetch/decode unit 1 controls a pointer for indicating an empty entry 61 of the re-order buffer 6 to be used next, and registers instruction information 63 such as the operation code of an instruction and register information, an instruction branching level 64, etc. into the empty entry 61, The branching level 64 is a control signal for discriminating non-speculative execution/ speculation execution for every instruction. When the instruction concerned is an instruction for non-speculative execution, the branching level 64 is set to zero, and when the instruction concerned is an instruction for speculative-execution, the branching level 64 is set to a value which is equal to or more than 1 and determined by the number of branch instructions interposed between the instruction for the non-speculative execution and the instruction for the speculative execution. The entry 61 of the re-order buffer 6 is provided with V bit 62 indicating whether the entry concerned is in use or not, and the DONE bit 65 for indicating whether execution of the instruction of the entry concerned is finished or not. At the instruction registration time, the V bit 62 is set to "1" to indicate "in use", and the DONE bit 65 is set to "0" to indicate "no finish".

Further, the instruction fetch/decode unit 1 registers with the reservation station 8 the decode result of each instruction together with the branching level of the instruction and the WRB number of the entry 61 of the re-order buffer 6 in which the instruction is registered. When all the function units corresponding to the operand of the instruction registered are available, the reservation station 8 issues an instruction to the corresponding function units of the branching unit 2, the operation unit 3, the store unit 4 and the load unit 5. At this time, the branching level and the WRB number are added to the instruction to be issued.

The branching unit 2 executes the issued branch instruction, and outputs a branch-prediction success/failure signal specifying the WRB number appendant to the branch instruction concerned to the instruction fetch/decode unit 1, the reservation station 8, the re-order buffer 7 and the load unit 5. In the instruction fetch/decode unit 1, a branch record is renewed on the basis of the branch-prediction success/ failure signal. In the reservation station 8, when the branch prediction succeeds, the branch level of each instruction held is decremented by 1, and when the branch prediction fails, all the instructions for which the branch level is equal to or greater than 1 are cancelled. In the re-order buffer 6, when the branch prediction succeeds, the branch level 64 of each instruction held in the entry 61 is decremented by 1, and when the branch prediction fails, all the instructions for which the branch level is equal to or greater than 1 are cancelled and the V bit 62 of the entry 61 which is held is set to "0" to allow re-use. The processing of the load unit 5 receiving the branch prediction success/failure signal is described below.

The operation unit 3 executes an issued operation instruction, and at the time when the operation instruction is finished, it specifies the WRB number appendant to the operation instruction and transmits an end notification to the re-order buffer 6. The re-order buffer 6 turns on the DONE bit 65 of the entry 61 of the WRB number thus specified to "1" (indicating the end of the instruction).

The store unit 4 transmits a store request to the main memory according to an issued store instruction, specifies the WRB number appendant to the store instruction concerned when the store instruction is finished, and transmits an end notification to the re-order buffer 6. The re-order buffer 6 turns on the DONE bit 65 of entry 61 of the WRB number thus setting it to "1" (indicating the end of the instruction).

The load unit 5 is equipped with a managing part 51 having plural entries 52, each of which holds a load instruction 53 issued to the lead unit 5 together with the branch level 54 and WRB number 55 appendant thereto. Upon receiving the branch prediction success/failure signal from the branch unit 2, the managing part 51 decrements the branch level 54 of the load instruction held in the entry 52 by 1 when the branch prediction succeeds, thereby managing the latest speculation state of each load instruction. When the branch prediction fails, the managing part 51 sets the entries 52 having the branch level 54 of 1 or more to a canceled state. The load instructions registered in the respective entries 52 of the managing part 51 are processed in the order of issuance, and the processing for transmission of cache data from a data cache (not shown), transmission of a load request to the main memory in the case of a mis-hit, writing of the replay data to the load request into the data cache are all executed. If the entry 52 for storing a load instruction is not set to the canceled state at the execution end time of the load instruction concerned, the WRB number 55 stored in the entry 52 is specified and an end notification is transmitted to the re-order buffer 6. The re-order buffer 6 sets the DONE bit 65 of the entry 61 of the specified WRB number to "1" (indicating the instruction end). On the other hand, if the entry 52 for storing a load instruction for which the execution is finished is set to the canceled state, the end notification to the re-order buffer 6 on the basis of the WRB number 65 is suppressed.

The settling unit 7 records all the non-completed instructions to the entries 61 of the re-order buffer 6, and receives the end notification specifying the WRB number from the respective function units 2 to 5 to set the DONE bit 65 of the corresponding entry 61 to "1", thereby managing the presence or absence of the execution end of each instruction. A plurality of entries 61 for holding non-completed instructions are provided in re-order buffer 6, and a physical number is given to each entry 61 to enable each entry to be uniquely identified. The number given to each entry 61 is called a "WRB number". Each entry 61 contains instruction information 63 which includes the operation code of an instruction decoded by an instruction fetch/decode unit 1, register information and DONE bit 65 indicating whether execution of an instruction registered in each entry 61 is has been completed. This bit is called a "DONE bit". The DONE bit 65 is turned on at the time when the instruction concerned is finished. With respect to an instruction for which the DONE bit 65 is turned on because the instruction operation in the corresponding function unit is completed, the branch related with the instruction is settled and all the previously-issued instructions are settled, the settling unit 7 carries out the processing of writing the execution result of the instruction concerned into a software-visible register or the like. When the branch prediction fails, all the results of the subsequent instructions of the branch concerned are invalidated, and all the instructions under the speculation state at the present time are cancelled from the re-order buffer 6. In order to manage which instruction the speculation instruction at the present time corresponds to, the settling unit 7 decrements the branch level 64 of each instruction held in the entry 61 by 1 when the branch prediction success is notified from the branch unit 2, thereby managing the latest speculation state of each instruction. Accordingly, when receiving the branch prediction failure signal from the branch unit 2, instructions having the branch level of 1 or more are speculation instructions at the present time, and all the speculation instructions are cancelled. In addition, the V bits 62 of the entries 61 holding these speculation instructions are set to "0", thereby enabling their re-use.

Description of Embodiments

Figure 2:
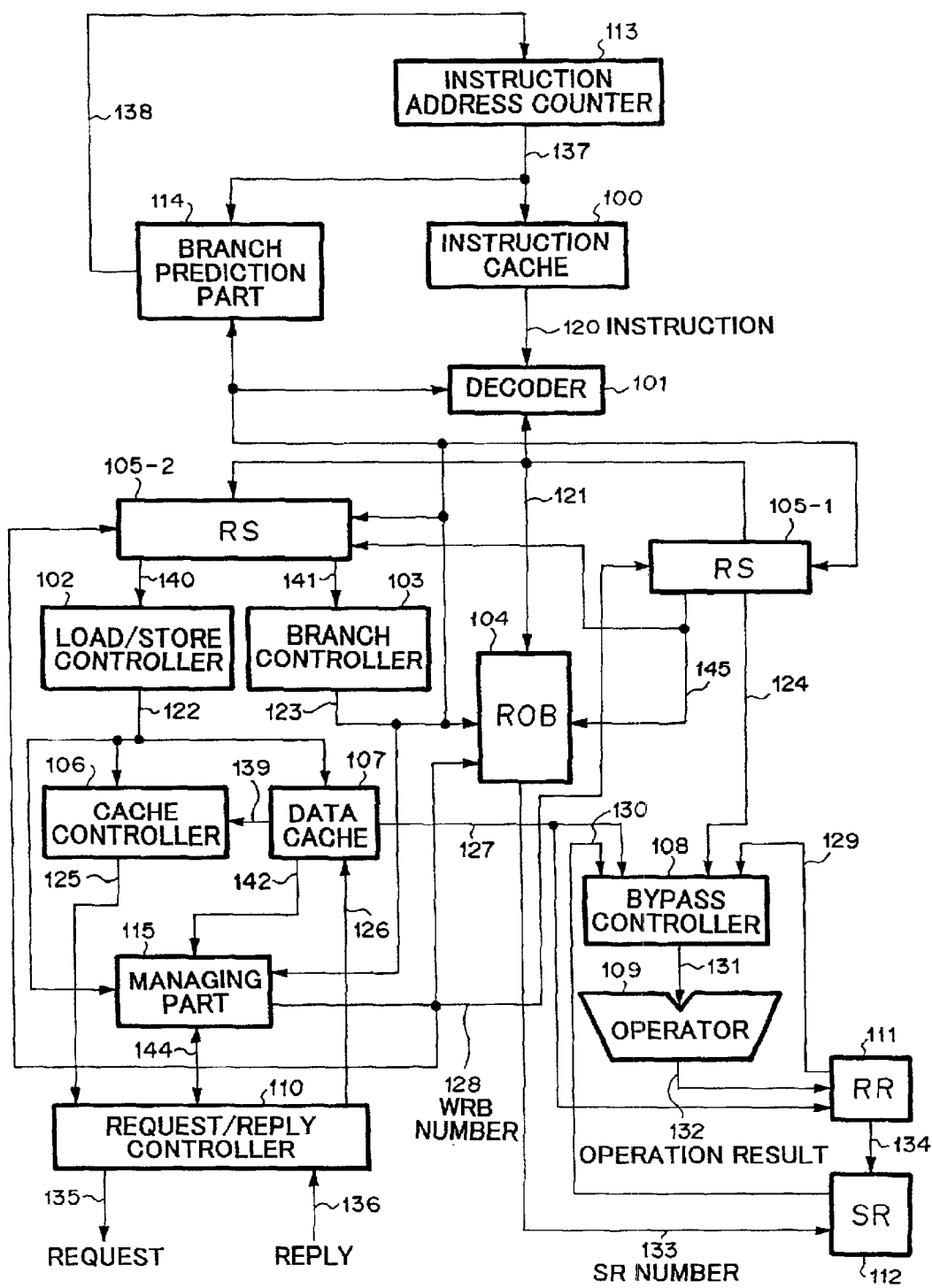
FIG. 2 is a block diagram showing an embodiment of the processor to which the present invention is applied.

FIG. 2 is a block diagram showing an embodiment of a processor of the present invention. The processor of this embodiment includes instruction cache 100, decoder 101, load/store controller 102, branch controller 103, re-order buffer (ROB) 104, reservation stations (RS) 105-1 and 105-2, cache controller 106, data cache 107, bypass controller 108, operator 109, request/reply controller 110, renaming register (RR) 111, scalar register (SR) 112, instruction address counter 113, branch prediction part 114 and managing part 115 as main parts, and performs parallel execution of instructions through an instruction pipeline, particularly out-of-order execution.

With respect to FIG. 1, the instruction address counter 113, the instruction cache 100, the decoder 101 and the branch prediction part 114 correspond to the instruction fetch/decode unit 1, the reservation stations 105-1 and 105-2 correspond to the reservation station 8, the load/store controller 102, the cache controller 106, the data cache 107, the request/reply controller 110 and the managing part 115 correspond to the store unit 4 and the load unit 5, the branch controller 103 corresponds to the branch unit 2, the re-order buffer 104 corresponds to the settling unit 7 having the re-order buffer 6, and the bypass controller 108 and the operator 109 correspond to the operation unit 3. The renaming register 111 and the store register 112 which are not shown in FIG. 1 are illustrated in FIG. 2.

The renaming register 111 contains a register which is in one-to-one correspondence with the entry of the re-order buffer 104, and the result of an operating instruction, a load instruction or the like stored in an entry having WRB number "1" of the re-order buffer 104 is stored in the register corresponding to the WRB number i in the renaming register 111. Thereafter, when the instruction stored in the entry of the WRB number i of the re-order buffer 104 is settled, the scalar register number stored in the entry concerned is output to a path 133, and the register corresponding to the WRB number i in the renaming register 111 is written into the register specified by the scalar register number in the scalar register 112 through a path 134.

The construction and operation of this embodiment will be described in detail below.

The instruction address specified by the instruction address counter 113 is given through path 137 to the instruction cache 100 and the branch prediction part 114. The branch prediction part 114 receives an instruction address specified by the instruction address counter 113 to judge whether the branch record of a branch instruction indicated by the instruction address concerned is or is not registered. If it is registered, success/failure of branching is predicted on the basis of a past registered branch record. If the branch success is predicted, a branch destination address is transmitted to the instruction address counter 113 through path 138 to renew the instruction address counter 113. In the case where the branch fails and in the case where the instruction is out of the branch instruction, the counter value of the instruction address counter 112 is incremented by every amount of one instruction.

The decoder 101 decodes an instruction fetched from the instruction cache 100 through path 120, carries out the processing to suppress hazards caused by a register number while devising allocation of the renaming register 111 in consideration of preceding instructions accumulated in the re-order buffer 104, and registers information from decoded instructions or the like into the re-order buffer 104 in the instruction order of the program. In the case of an operation instruction, the decoder 101 registers the decoded data into the reservation station 105-1 of the operation system. In the case of a branch instruction or a load/store instruction, the decoder 101 registers the decoded data into the reservation station 105-2.

Figure 3:
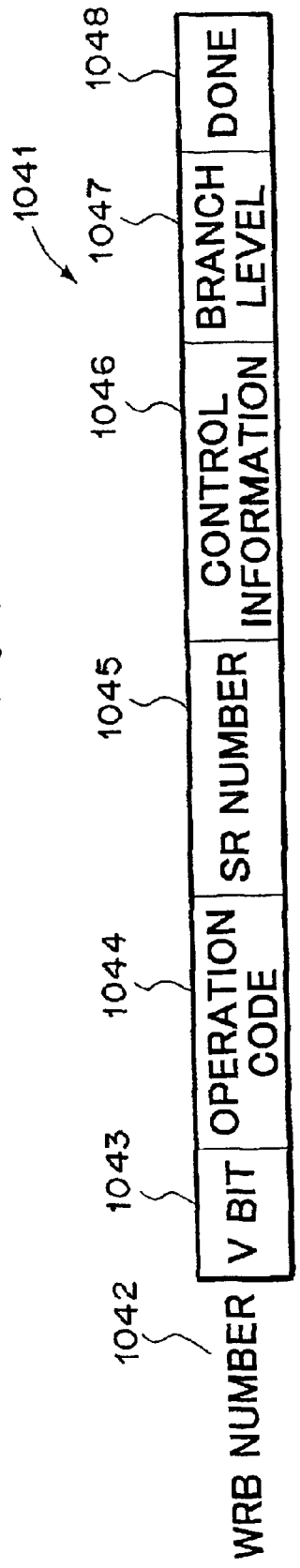
FIG. 3 is a diagram showing the construction of an entry of a re-order buffer.

FIG. 3 shows the construction of the entry of the re-order buffer 104. WRB number 1042 for uniquely identifying the entry thereof is physically given to each entry 1041. Each entry 1041 contains V bit 1043 for indicating whether the entry concerned is in use or non-use, instruction operation code 1044, scalar register number (SR number) 1045 for storing the result of the instruction concerned, control information 1046, branch level 1047 and ONE bit 1048 for indicating whether the instruction concerned is or is not finished. The contents of the entries of the reservation stations 105-1 and 105-2 are substantially the same as the entries of the re-order buffer 104.

Figures 4A, 4B:
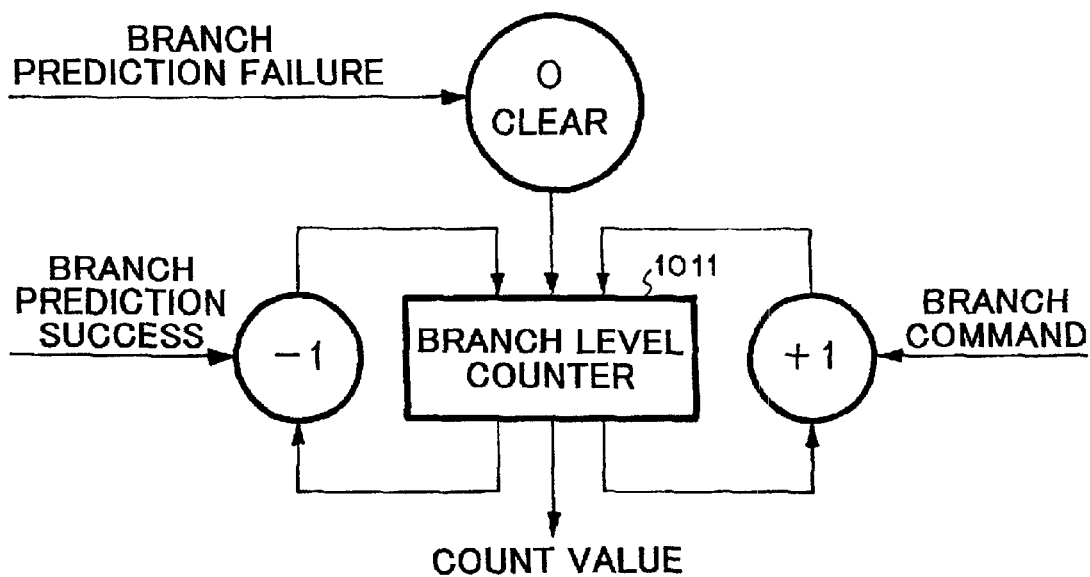
FIGS. 4A and 4B are diagrams showing a method of generating a branch level in a decoder.

The branch level 1047 is generated in such a manner as shown in FIG. 4A in the decoder 101. The decoder 101 has branch level counter 1011, and the initial value is set to zero. In this state, instructions are successively decoded, and the current count value 0 of the branch level counter 1011 is allocated to each instruction as branch level 0. When one branch instruction is decoded, the branch level counter 1011 is incremented by 1, and the branch level "1" is allocated to the subsequent instructions of the branch instruction concerned. Further, when another branch instruction is decoded, the branch level counter 1011 is incremented by 1. When the decoded branch instruction is executed in the branch controller 103 and the branch prediction success/failure signal associated with the branch instruction concerned is output to the path 123, the decoder 101 decrements the branch level counter 1011 by 1 if the branch prediction succeeds. On the other hand, if the branch prediction fails, the decoder 101 clears the branch level counter 1011 and sets it to 0.

When plural instructions from load instruction 1 through branch instruction 3 as shown in FIG. 4B are fetched from the instruction cache 100, the decoder 101 allocates the branching levels as shown in FIG. 4B to the respective instructions, and registers the instructions into the re-order buffer 104 through path 121. The operation instructions from these instructions are also registered in the reservation station 105-1, and the load instructions, the store instructions and the branch instructions are also registered in the reservation station 105-2. In the re-order buffer 104 and the reservation stations 105-1 and 105-2, when the branch prediction success/failure signal are output from the branch controller to the path 123, all the branch levels of entries having a branch level of 1 or more are decremented by 1 if the branch prediction succeeds, and all the instructions of entries having the branch level of 1 or more are cancelled if the branch prediction fails.

The control information 1046 in FIG. 3 is mainly information related with operands. In the case of an instruction having a dependence relationship with a preceding instruction, the WRB number of an entry of the re-order buffer 104 in which the preceding instruction is stored is included in the control information 1046. For example, in the case of a subsequent instruction having as a source the execution result of an instruction stored in an entry having WRB number equal to 10 of the re-order buffer 104, the WRB number of 10 is included in the control information 1046. When all the execution results of the instructions stored in the entries having WRB numbers described in the control information 1046 are allowed to be used, preparation of the operands of the instructions of the entries concerned is completed. Therefore, if there are empty resources of the corresponding function units, the instructions are issued from the reservation stations 105-1 and 105-2.

Next, the construction and operation of this embodiment will be described while dividing into a load/store system, an operation system and a branching system.

Description of the Load/Store System

Upon receiving a load instruction and a store instruction from the reservation station 105-2 through path 140, the load/store controller 102 transmits the instructions through path 122 to the cache controller 106 and he data cache 107, and transmits the data to the managing part 115.

The managing part 115 has plural entries for holding issued load instructions and store instructions until the processing of the instructions is completed, and registers into empty entries the load instructions and store instructions transmitted from the load/store controller 102 through the path 122 to manage these instructions.

Figure 5:
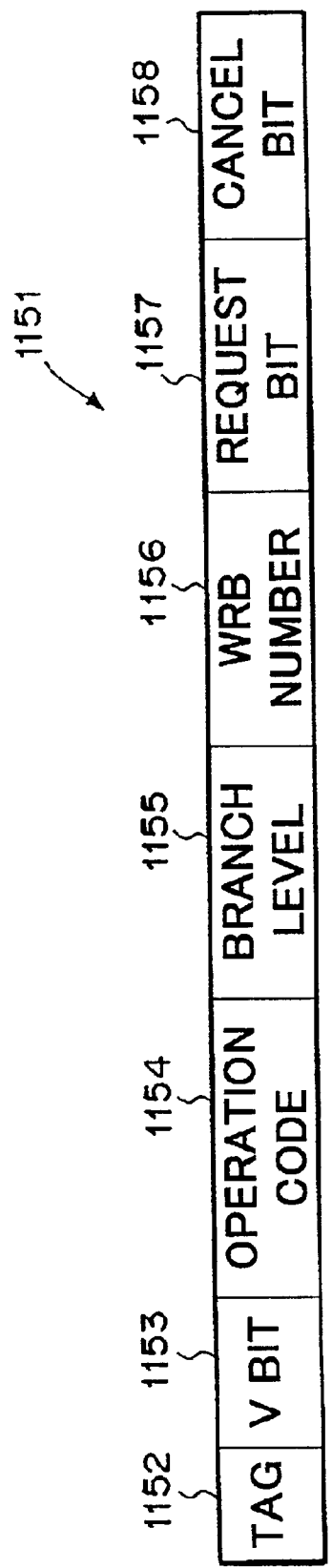
FIG. 5 is a diagram showing the,construction of an entry provided to a managing part of a load system.

FIG. 5 shows the construction of entry 1151 provided to the managing part 115. Tag 1152 is an identifier attached when the load instruction or store instruction registered in the entry concerned is transmitted to the main memory, and it is preset. Since the same tag is returned when a reply is returned from the main memory, the tag 1152 is used to discriminate which instruction corresponds to the reply. V bit 1153 indicates whether the entry concerned is in use or not used, and it is set to "1" when it is used, and it is set to "0" when it is not used. An operation code 1154, branch level 1155 and WRB number 1156 are the operation code of the load instruction or store instruction thus issued, and the branch level and WRB number are appended to the instruction, respectively. Request bit 1157 is a bit for managing whether the request of the load instruction or store instruction concerned is or is not output to the main memory, and it is set to "1" at the time when the request is transmitted to the main memory. Cancel bit 1158 is set to "1" if the load instruction or store instruction concerned is cancelled.

In the case of a load instruction, the data cache 107 judges a hit or miss, and in the case of "hit", the data cache 107 transmits the cache data through the path 127 to the bypass controller 108, and notifies this fact through a path 142 to the managing part 115 while specifying the WRB number appended to the load instruction concerned. If the cancel bit 1158 of the entry 1151 having the same WRB number is set to "0", the managing part 115 transmits an end notification specifying the WRB number through path 128 to the re-order buffer 104 and the reservation station 105-1 and 105-2. If the cancel bit 1158 is set to "1", an end notification is not transmitted.

The data cache 107 transmits a miss-signal through path 139 to the cache controller 106 when a cache-miss is made. The cache controller 106 transmits a cache-miss request through path 125 to the request/reply controller 110 while specifying the WRB number. If the cancel bit 1158 of the entry 1151 having the specified WRB number in the managing part 115 is not set to "1", the request/reply controller 110 transmits a load request through path 135 to the main memory (not shown) with appended tag 1152. When reply data having the tag appended thereto is returned from the main memory through the path 136, the request/reply controller 110 refers to the cancel bit 1158 of the entry 1151 having the same tag appended thereto in the managing part 115 through path 144. If it is not set to "1", the data is written into the data cache 107 through the path 126, and also transmitted out to the bypass controller 108 and the renaming register 111 through the path 127. If the cancel bit 1158 is set to "0", this operation is not carried out. In any case, the tag is provided to the managing part 115, and the end of the load instruction is notified. If the cancel bit 1158 of the entry 1151 having the same tag appended thereto is set to "0", the managing part 115 transmits the end notification specifying the WRB number 1156 of the entry concerned through path 128 to the re-order buffer 104 and reservation stations 105-1 and 105-2. However, if the cancel bit 1158 is set to "1", an end notification is not transmitted.

In the case of the store instruction, the cache controller 106 transmits a store request through the path 125 to the request/reply controller 110 while specifying the WRB number irrespective of a hit or miss of the data cache 107. The request/rely controller 110 refers to the entry 1151 having the specified WRB number from the managing part 115 through the path 144, and makes a store request through the path 135 to the main memory with the tag 1152 attached thereto. When a reply is returned from the main memory, the completion of the store instruction is notified to the managing part 115 while specifying the tag. If the cancel bit 1158 of the entry 1151 having the same tag appended thereto is set to "0", the managing part 115 transmits the end notification specifying the WRB number 1156 of the entry concerned through the path 128 to the re-order buffer 104 and the reservation stations 105-1 and 105-2. However, if the cancel bit 1158 is set to "1", an end notification is not transmitted.

Description of the Operating System

When an operating instruction is issued from the reservation station 105-1 through the path 124, the bypass controller 108 transmits an operating instruction issued from the reservation station 105-1 through path 131 to the operator 109 to perform an operation by using data transmitted from the renaming register 111 through path 129, data transmitted from the scalar register 112 through path 130 and data transmitted from the data cache 107 through path 127. The operation result achieved by the operator 109 is registered in accordance with the WRB number appended to the operation instruction concerned in the renaming register 111 through path 132.

The reservation station 105-1 of the operating system manages the number of cycles needed to finish the instruction after issuance of the operation instruction, and it transmits an end notification to the re-order buffer 104 and the reservation station 105-2 through path 145 while specifying the WRB number every time the instruction is finished.

Description of the Branching System

Upon receiving a branch instruction from the reservation station 105-2 through path 141, the branching controller 103 makes a branch judgment of the branch instruction concerned, and transmits a branch prediction success/failure signal having a WRB number appended thereto through the path 123 to the branch prediction part 114, the decoder 101, the re-order buffer 104, the reservation stations 105-1, 105-2 and the managing part 115. The branch prediction part 114 renews the branch record on the basis of the branch prediction success/failure signal. In each of the re-order buffer 104 and the reservation stations 105-1 and 105-2, the branch level of each instruction held in the entry thereof is decremented by 1, if the branch prediction succeeds, and all the instructions having the branch level of 1 or more are cancelled if the branch prediction fails. If the branch prediction succeeds, the managing part 115 decrements the branch level 1155 of the instruction held in the entry 1151 thereof by 1, and if the branch prediction fails, the managing part 115 sets the cancel bits 1158 of the entries 1151 holding the instructions having the branch level of 1 or more to "0", thereby setting the entries concerned to the canceled state.

FIG. 6 is a diagram showing the re-order buffer 104 at the time when the execution is finished until the store instruction 1 of the instruction string shown in FIG. 4B. Thereafter, the branch instruction 1 is executed, and the operation instruction 2, the operation instruction 3, the load instruction 3, the load instruction 4, the operation instruction 4, etc. of the subsequent instructions are speculatively executed while a branch judgment is made in the branch controller 103. If the branch prediction failure of the branch instruction 1 is settled, all the instructions having the branch level of 1 or more are cancelled, and all the entries used therefor are re-used by the subsequent instructions in the branch direction determined by the branch instruction 1. In the prior art, the entries of the load instruction 3, the load instruction 4, etc. are not available until the notification of the WRB numbers of the entries is completed.

As described above, according to the present invention, the entries of the re-order buffer, in which the subsequent instructions of the branch instruction which the branch-prediction has failed are stored, can be re-used for storage of new instructions without waiting for the end notification based on the WRB numbers of the entries concerned. Therefore, the entries of the re-order buffer can be effectively used, and thus the range of an out-of-order executable instruction string can be enlarged.

What is claimed is:

1. A managing method for a re-order buffer in an out-of-order execution processor for predicting the flow of a program by branch prediction, determining a next executable instruction from an instruction string in the program and speculatively executing the instruction based on a dependence relationship between the prediction and the instruction, in which said re-order buffer rewrites an execution result according to a program order and the end of the instruction is notified from each of a plurality of function units containing a branching unit and a load unit to said re-order buffer by using a WRB number corresponding to an entry number of said re-order buffer, which comprises the steps of:

managing a latest speculation state of a load instruction issued to said load unit by said load unit based on a branch prediction success/failure signal output from said branching unit and suppressing notification to said re-order buffer by said load unit, as to a subsequent load instruction of a branch instruction for which the branch prediction has failed, based on the WRB number of the subsequent load instruction even if the processing of the load instruction issued to said load unit is finished, and re-using an entry stored with the subsequent load instruction of the branching instruction for which the branch-prediction has failed, by the re-order buffer, to store a new instruction before the end notification based on the WRB number of the entry concerned is received, wherein a control signal for discriminating non-speculative execution/speculative execution for every instruction under consideration, which corresponds to a branching level, is generated in an instruction fetch/decode unit, the branching level being set to zero when an instruction under consideration is an instruction for non-speculative execution, and the branching level being set at a value of 1 or more which is determined by the number of branching instructions interposed between an instruction for the non-speculative execution and an instruction for the speculative execution when an instruction under consideration is an instruction for speculative execution, the control signal thus generated is held in said re-order buffer and said load unit, and the branching level is decremented by 1 in said re-order buffer and said load unit when a branch-prediction failure signal is output from said branching unit, thereby managing the latest instruction speculation state.

2. The managing method as claimed in claim 1, wherein said load unit has plural entries, each of which holds a load instruction issued to said load unit together with the branching level and the WRB number thereof, and wherein the entries having a branching level of 1 or more are set to a cancel state when a branch-prediction failure signal is output from said branching unit, and with respect to load instructions held in the entries under the cancel state, a notification to the re-order buffer based on the WRB numbers of the load instructions issued to said load unit is suppressed even if the processing of the load instructions issued to said load unit is finished.

3. An out-of-order execution processor for predicting the flow of a program by branch prediction, determining a next executable instruction from an instruction string in the program and speculatively executing the instruction based on a dependence relationship between the prediction and the instruction, in which a re-order buffer in said processor rewrites an execution result according to a program order and the end of the instruction is notified from each of a plurality of function units containing a branching unit and a load unit to said re-order buffer by using a WRB number corresponding to an entry number of said re-order buffer, which comprises:

managing means for managing a latest speculation state of a load instruction issued to said load unit based on a branch prediction success/failure signal output from said branching unit and suppressing notification to said re-order buffer, as to a subsequent load instruction of a branch instruction for which the branch prediction has failed, based on the WRB number of the subsequent load instruction even if the processing of the load instruction issued to said load unit is finished, said managing means being contained in said load unit, wherein the re-order buffer re-uses an entry stored with the subsequent load instruction of the branching instruction for which the branch prediction has failed, to store a new instruction before the end notification based on the WRB number of the entry concerned is received, wherein a control signal for discriminating non-speculative execution/speculative execution for every instruction under consideration, which corresponds to a branching level, is generated in an instruction fetch/decode unit, the branching level being set to zero when an instruction under consideration is an instruction for non-speculative execution, and the branching level being set at a value of 1 or more which is determined by the number of branching instructions interposed between an instruction for the non-speculative execution and an instruction for the speculative execution when an instruction under consideration is an instruction for speculative execution, the control signal thus generated is held in said re-order buffer and said managing means, and the branching level is decremented by 1 in said re-order buffer and said managing means when a branch-prediction failure signal is output from said branching unit, thereby managing the latest instruction speculation state.

4. The processor as claimed in claim 3, wherein said managing means has plural entries, each of which holds a load instruction issued to said load unit together with the branching level and the WRB number thereof, and wherein the entries having a branching level of 1 or more are set to a cancel state when a branch-prediction failure signal is output from said branching unit, and with respect to load instructions held in the entries under the cancel state, a notification to the re-order buffer based on the WRB numbers of the load instructions issued to said load unit is suppressed even if the processing of the load instructions issued to said load unit is finished.

* * * * *